United States Patent [19]
Bennett et al.

[11] Patent Number: 4,732,213
[45] Date of Patent: Mar. 22, 1988

[54] COLLOIDAL SILICA-BASED FLUID DIVERSION

[75] Inventors: Karl E. Bennett, Hockessin; John L. Fitzjohn, Wilmington, both of Del.; Richard A. Harmon, Ponca City, Okla.; Paul C. Yates, Jr., Wilmington, Del.

[73] Assignees: Conoco Inc., Ponca City, Okla.; E. I. Du Pont de Nemours and Company, Wilmington, Del.

[21] Appl. No.: 907,693

[22] Filed: Sep. 15, 1986

[51] Int. Cl.[4] .......................................... E21B 33/138
[52] U.S. Cl. .................................... 166/292; 166/275
[58] Field of Search ................. 166/292, 294, 295, 275

[56] References Cited

U.S. PATENT DOCUMENTS

| | | | |
|---|---|---|---|
| 3,701,384 | 10/1972 | Routson et al. | 166/292 |
| 3,759,326 | 9/1973 | Christopher et al. | 166/275 |
| 3,817,330 | 6/1974 | Christopher et al. | 166/275 |
| 3,868,999 | 3/1975 | Christopher et al. | 166/292 |
| 3,965,986 | 6/1976 | Christopher | 166/292 |

*Primary Examiner*—Stephen J. Novosad
*Assistant Examiner*—Bruce M. Kisliuk

[57] ABSTRACT

A process for selectively plugging permeable zones in subterranean formations or for plugging subterranean leaks which comprises injecting into the permeable zone or the site of the subterranean leak an aqueous solution containing 1 to 70 weight percent of a non-aggregated colloidal silica sol having a particle size in the range between 4 and 100 nm and a pH in the range between about 1 and 10, and causing said solution to gel in said zone or at said site.

23 Claims, 1 Drawing Figure

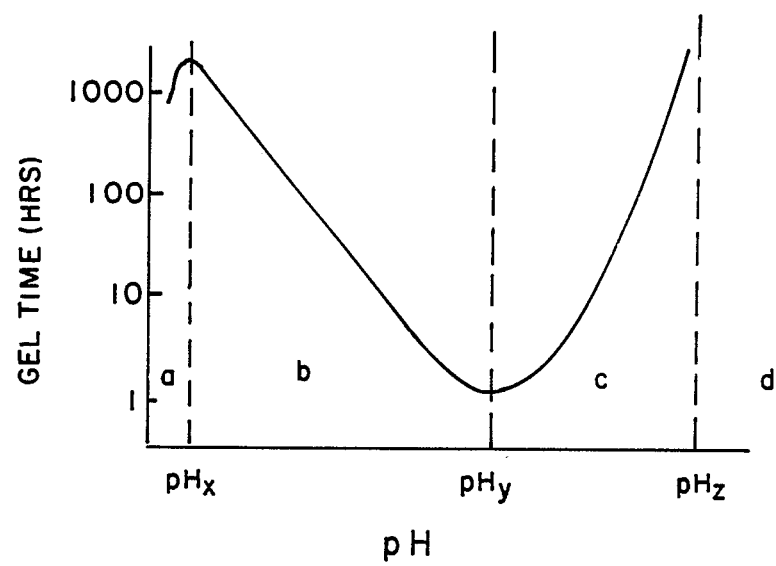

COLLOIDAL SILICA-BASED FLUID DIVERSION

FIELD OF THE INVENTION

The present invention relates to processes in which aqueous non-aggregated colloidal silica sols are used to selectively plug permeable zones in subterranean formations or to plug subterranean leaks.

BACKGROUND OF THE INVENTION

Recovery of oil from subterranean formations frequently involves displacing crude oil with a driving fluid, e.g., gas, water, brine, steam, polymer solution, foam, or micellar solution. Ideally, such techniques (commonly called flooding techniques) would provide a bank of oil of substantial depth being driven to a producing well; in practice, that frequently is not the case. Oil-bearing strata are usually heterogeneous, some parts of them being more permeable to a driving fluid than others. As a consequence, channeling frequently occurs so that the driving fluid flows preferentially through zones depleted of oil (so-called "thief" zones) rather than through those parts of the strata which contain sufficient oil to make oil-recovery operations profitable. High permeability zones can also cause undesirable loss of drilling fluids when a well (e.g., water, oil or waste disposal) is being drilled. Misplaced casing perforations or casing leaks are another cause of channeling of the driving fluid through zones of high permeability in the subterranean formations. In addition, casing leaks sometimes occur in the annular region above the injection or production packer, and need to be dealt with whether the leaks occur in high or low permeability zones.

A variety of fluid diversion techniques have been proposed in the prior art. Typically, a gel is formed in situ in zones of very high permeability, thus plugging them and causing fluid to flow through zones which originally were of lower permeability than those which have been plugged. However, such techniques are in general not suitable at temperatures in excess of about 100° C. and are limited to short gel times, e.g., less than 12 hours, thereby severely limiting their effectiveness. Thus, the prior art fluid diversion gels cannot be used in high temperature reservoirs commonly encountered in deep wells or in steam-flood operations, and in many cases the treatment composition can be pumped only a short distance from the wellbore before it gels regardless of reservoir temperature.

It has been proposed that sodium silicate gels be used to plug subterranean permeable zones. For example, U.S. Pat. No. 1,421,706 discloses that an aqueous solution of sodium silicate can be reacted with alkaline earth metal compounds, or with HCl, to produce cementing precipitates in wells. Similarly, in U.S. Pat. No. 3,202,214, aqueous sodium silicate solutions are reacted with an agent that will cause gelling of the sodium silicate solution, for example a substance that will liberate hydrogen ions, an agent which undergoes the Cannizzaro reaction, or a mixture of a reducing agent and an oxidizing agent. Hess, in U.S. Pat. No. 3,850,249, discloses a method for treatment of a permeable formation by delayed gelling of an acid-gelable liquid, gelation being delayed by latent pH adjustment to a pH of less than 5 at a temperature in the range of $-10°$ to $175°$ C. The patent examples demonstrate gel times of less than one day at 80° C. and the claims are limited to organic settable liquids having gel times of 1-24 hours. In U.S. Pat. No. 4,015,995 (a divisional of 3,850,249), Hess discloses and claims aqueous or alcoholic inorganic silicates as the acid-gelable material; however, none of the patent examples relates to any such silicate. The use of sodium silicate for this purpose is not without its problems. Competing with the availability of the silicate gel to plug the formation is the tendency of the silicate to coat particulate matter in the formation rather than forming a space-filling gel that plugs the interstices. Moreover, sodium silicate gels are not suitable at high temperatures and their gel times are too short for many operations. In addition, silicates are injected in wells at either a high or a low pH, not near neutral. That means that reactions which are usually undesirable, such as ion exchange and mineral dissolution, will proceed more rapidly than at a neutral pH. Also, the gel time of sodium silicate solutions is extremely sensitive to changes in pH, temperature, ionic strength, concentration, and the like. Furthermore, silicates at high ionic strengths are ineffective for forming gels. Small variations in salt concentration, pH, and polyvalent metal cations at low concentation, such as calcium and magnesium, can cause premature gelling, or delay gelling long after the desired gelling time. Because of the heterogenous nature of underground formations, such small variations will occur frequently and the excessive sensitivity of silicate gels to such variation makes their control in practical use very difficult.

Christopher, in U.S. Pat. No. 3,965,986, discloses a method for plugging zones of high permeability in which an aqueous slurry of colloidal fumed silica is combined in the high permeability zone with a surfactant or surfactant solution. The aqueous slurry of colloidal fumed silica may be pumped into the high permeability zone first followed by the aqueous surfactant or vice versa. Like the others in prior art, there are disadvantages to the Christopher technique. Christopher discloses that colloidal fumed silica is agglomerated to the extent that even after deagglomeration in a Cowles high speed mixer, it is necessary to continue mixing the slurry at a slow speed to prevent settling, and the continued mixing notwithstanding, it is also necessary to use the colloidal silica within 48 hours. Many formations which must be sealed consist of relatively small pores even though they may still be more permeable than desired. The aggregated compositions of Christopher may not be able to penetrate such formations. In contrast, the disaggregated sols of this invention can enter even the smallest or tightest formations which it might be desirable to plug. Such pores are of the order of a micron or larger (i.e., $10^{-4}$ centimeters) whereas the colloidal particles of this invention are only $4\times10^{-3}$ to 0.1 microns (i.e., $4\times10^{-7}$ to $10^{-5}$ centimeters) in diameter. The fact that Christopher's silica compositions must be stirred continuously to avoid settling indicates that they contain particles in excess of a micron in diameter and thus could not enter the smallest pore formations. Moreover, Christopher's technique requires mixing of the fumed silica with the surfactant in the subterranean formation. Effective mixing would be difficult if not impossible to obtain; only the fluids at the interface will mix. Apparently to minimize disadvantages of ineffective mixing, Christopher proposes alternately injecting small quantities of surfactant and fumed silica. However, if one of the first slugs of fumed silica should gel upon contact with the surfactant, further pumping of alternating slugs of fumed silica and surfactant would be impeded, or blocked entirely, thus making it impossible to effect blocking of permeable zones except those that are immediately adjacent to the well bore. Furthermore, fumed silica, being substantially non-hydrated, can be very difficult to disperse in water.

OBJECTS OF THE INVENTION

It is an object of the present invention to provide a process for plugging subterranean leaks and permeable zones which can be used at temperatures as low as 5° C. and in excess of 100° C.

It is another object of this invention to provide such a process which makes possible gel times from minutes to in excess of several months.

It is yet another object of the invention to provide a composition whose particles are sufficiently small that the composition can be pumped or injected deep into subterranean formations.

It is still another object of the invention to provide a composition that is not as sensitive to changes in conditions as are soluble silicates.

It is another object of the invention to provide a composition which can be caused to gel at effective rates at pH near neutral.

Another object of the invention is to provide a composition that is miscible in water in all proportions and does not require agitation to prevent settling.

It is also an object of the invention to provide a composition and process which requires no mixing of different fluids in subterranean zones.

Yet another object of the invention is to provide a composition which, being water-based, flows preferentially into the most water-saturated portions of a subterranean zone; i.e., those most likely to be most highly permeable to water-based fluids.

BRIEF SUMMARY OF THE INVENTION

The present invention relates to a process for selectively plugging permeable zones in subterranean formations or for plugging subterranean leaks which comprises injecting into the permeable zone or the site of the subterranean leak an aqueous solution containing a non-aggregated colloidal silica sol and causing the solution to gel.

BRIEF DESCRIPTION OF THE FIGURE

FIG. 1 shows schematically the gel time as a function of pH.

DETAILED DESCRIPTION OF THE INVENTION

The non-aggregated colloidal silica sols used in the invention in general have average particle diameters in the range between about 4 and 100 nanometers, preferably between 4 and 22 nanometers, most preferably between 7 and 22. Gelling of the non-aggregated colloidal silica sol is affected by a number of factors. Smaller particle size can promote faster gelling of the non-aggregated colloidal silica sol. Both low and high pHs can cause long gelling times and intermediate pHs shorter gelling times. Generally, the pH upon initial injection into the subterranean leak or formation should be between 1 and 10, preferably between about 5 and 9, most preferably between 5.5 and 7.5. Buffers can be added, if desired, to adjust the initial pH or to help keep the pH of the solution within a desired range. Once the aqueous solution of the colloidal silica sol has been gelled, the pH can be varied between 1 or less and about 10 without significantly affecting gel properties. Thus, treatment of the well with HCl can be effected without dissolving the gel used to plug the leak or the permeable zone. The temperature of the aqueous solution of the silica sol also affects the formation of the colloidal silica gel; higher temperatures generally favoring more rapid gelling. Gels can be formed from the aqueous non-aggregated colloidal silica sols at temperatures from 5° to 200° C. or higher. Such gels are stable indefinitely at temperatures between 5° and 200° C. and are stable for a few days at temperatures as high as 260° C.. Because of their exceptionally low permeabilities, the gels of the invention can withstand contact by fluids having temperatures as high as 350° C., e.g., steam.

Not only is particle size of the colloidal silica sol a factor in the rate at which the colloidal silica gel is formed, so is the concentration of the colloidal silica sol in the aqueous solution. Higher concentration of silica sol in the aqueous solution promotes higher gelling rates. In general, concentrations in the range between 1 and 70 weight percent colloidal silica can be used. Commercial silica sols are available at concentrations running between 30 and 50 weight percent. Those commercial sols can be used as such or diluted to a lower silica content. For example, sols containing 2–40 weight percent of silica are generally used for the purposes of this invention. Typically, the sol is diluted to 5–15 weight percent silica for use according to the invention. However, colloidal silica concentrations may vary with the use to which the colloidal silica solutions of the invention are put. When plugging casing leaks, the solutions will contain between 6 and 15 weight percent colloidal silica. When one is plugging a large thief zone, the bulk of the solution used for plugging regions significantly removed from the wellbore will contain 2 to 7.5 weight percent colloidal silica, preferably 4 to 6 weight percent. That portion of the solution that is used to treat regions of the thief zone which are not far removed from the wellbore will contain 7.5 to 15 weight percent colloidal silica, preferably 7.5 to 10.

The total ionic strength of the colloidal silica sol also will affect gelling. In general, the total ionic strength should be less than about 10, preferably less than 3.5, and most preferably 0.75 or less (sea water is about 0.72). Inorganic ions such as potassium, sodium, magnesium, calcium, chloride, sulfate, bisulfate, carbonate, or bicarbonate may be present naturally in the water used to prepare the solution, or they may be added intentionally so as to adjust the ionic strength. Polyvalent cations have a greater effect on gel time than their contribution to ionic strength would indicate. In field operations, the ionic strength of the treatment solution is one variable that can be adjusted to achieve a given gel time. However, to minimize the possibility of interaction with the formation or formation waters, a slug of a brine of appropriate ionic composition may be injected as a preflush. (For a definition of ionic strength, see W. J. Moore, *Physical Chemistry*, 4th edition, Prentice Hall, Inc., New Jersey, 1972, pg. 443.)

The foregoing factors do not function independently of one another; they act in concert. For example, at pH greater than roughly 8.5, high ionic strengths can cause colloidal silica solutions to separate into a clear, aqueous layer and a turbid, silica-rich layer instead of forming a space-filling gel (compare Examples 30–33, in which gels are formed at pH 9.9, to Examples 29 and 53, in which separate layers form at pH 9 and 9.3, respectively.) At lower pH's, however, gels form in the presence of much higher ionic strengths (Examples 24–27 and 51–52). The desired gel time will vary depending upon the circumstances. If, for example, one wishes to block a casing leak or plug a formation that is at or near the wellbore, or if the aqueous solution of the colloidal silica sol can be pumped into the desired part of the formation rapidly, e.g., through a fracture, then short gel times, e.g., from virtually 0 to 12 hours, are desired. If on the other hand the portion of the formation which is to be blocked includes regions far from the wellbore, long gel times are needed, e.g., from days to 1-2 months. The present invention makes possible both short gel times and very long ones. When long gel times are needed, ideally one should vary the gel time of the compositions being injected into the formation so that the last portion of the aqueous solution of non-aggregated colloidal silica sol to be injected into the formation will gel at nearly the same time as, or soon after, the first portion gels. The present invention permits tailoring gel times so as to permit one to effectively deal with just that type of situation.

In another embodiment of the invention, one or more latent gelling agents is combined with the aqueous non-aggregated colloidal silica sol. The latent gelling agents are not essential to gel formation. They can accelerate or delay gel formation. In most instances, the latent gelling agent accelerates gelation in comparison to the unmodified solution. However, it is important to note that often the intent in adding a latent gelling agent, even if it speeds gelation, is to more effectively obtain long gel times. Gels must be cured for some multiple of the initial gel time to reach full strength. This is because the factors that promote gelation also promote gel strengthening. As a consequence, in the absence of a latent gelling agent, if one adjusts conditions in a gelable formulation to give a long gel time, one may need to wait a very long time after gelation for the gel to strengthen sufficiently to block flow during normal well operations. One way around this problem is to add a latent gelling agent that before and/or shortly after gelation shifts conditions such as pH or ionic strength into a regime in which gelation, and hence gel strengthening, is faster than if the conditions in the absence of the latent gelling agent were maintained. This gives a faster gel strengthening than if the same gel time were achieved without the use of a latent gelling agent. The latent gelling agent may also make it easier to precisely engineer long gel times than if one relies solely on initial adjustment of pH and ionic strength.

The effect of the latent gelling agents depends on all the factors that affect gel time. FIG. 1 shows schematically the gel time as a function of pH for fixed values of the other variables. The gel time is a local maximum at $pH_x$ (usually <1) and a minimum at $pH_y$ (usually 5 to 7). The colloidal silica dissolves when $pH>pH_z$ (roughly 10). Four specific classes of latent gelling agents and the conditions in which they can be employed are given below. In items 1–3 below, latent gelling agents are described which release or consume an acid and/or base. One should not infer from that description that the specified release or consumption is the only result of the reaction in question. In reality the situation is much more complex. For example, when cellosolve acetate (an ester) is added to a colloidal silica sol at initial pH 8, the pH can first rise and then drop. Simple hydrolysis of the ester would give an acid and an alcohol and thus result in a drop in the pH. Thus, when it is stated below that the latent gelling agent releases or consumes an acid or base or both, reference is had to the ultimate condition effected by the latent gelling agent.

1. If the initial pH of the silica sol or the subterranean site to be treated is adjusted to be $pH_y<pH<pH_z$ (region c of FIG. 1) or $pH<pH_x$ (region a), the latent gelling agent can be selected from pH-adjusting agents that hydrolyze or decompose thermally to release an acid or consume a base, e.g., hydrolyzable esters, acid anhydrides, sulfonates, organic halides, or salts of a strong acid and a weak base. Compounds such as amides and nitriles that release a volatile base, e.g., ammonia, in addition to an acid are useful pH-adjusting agents in the context just described when the temperature is high enough that the volatile base leaves the liquid phase.

2. If the initial pH is adjusted to be $pH_x<pH<pH_y$ (region b), the latent gelling agent can be selected from pH-adjusting agents that hydrolyze or decompose thermally to release a base or consume an acid, e.g., quaternary ammonium salts, urea and substituted ureas, coordination compounds such as cupric ammonium sulfate, or salts of a strong base and a weak acid.

3. At temperatures low enough that the acid and base remain primarily in the liquid phase, and at all pH's<$pH_z$, but most effectively at pH's from 4 to 9, the latent gelling agent can be selected from pH-adjusting agents that hydrolyze or decompose thermally to release both an acid and a base that in combination act to buffer the pH near $pH_y$. For example, nitriles and amides hydrolyze to release an acid and ammonia, that tend to drive the pH to between 4 and 7.

4. At all pH's<$pH_z$, but most effectively at pH>4, the latent gelling agent can also be an aqueous solution containing a multivalent ion, e.g., $Ca++$, $Mg++$, or $Al+++$, and a chelating agent, such as ethylene diamine tetra-acetic acid (EDTA), a metal citrate, or ethylene glycol.

The compositions and processes of this invention can be combined with well-known pretreatments of the reservoir, e.g., a preflush to change the ionic strength of the reservoir fluids or to stabilize reservoir clays, or a preflush of steam or water (hot, ambient, or chilled) to alter the temperature of the reservoir. They can also be combined with a well-known post-treatment of the reservoir, e.g., a post-flush to displace treatment composition from the wellbore. The composition of this invention can also be combined with inert fillers, e.g., clays, silica flour, crushed walnut shells, crushed oyster shells or shredded magnetic tape, to bridge fractures or other large open spaces.

In the following examples which are illustrative of the invention, the aqueous non-aggregated colloidal silica sol employed was Du Pont Ludox® SM (d=7 nanometers), HS (d=12 nanometers), AM (d=12 nanometers) or TM (d=22 nanometers) colloidal silica. The surface of the Ludox AM colloidal silica is modified with aluminate ions. For Examples 1–72, the silica content was adjusted to the percentages shown in Tables by adding distilled water. Gel times were measured by sealing the aqueous solution in a glass pipet, placing the pipet in a constant-temperature oven, and observing the solution. Two numbers are given for each observed gel time. The first was the longest time during which the sample was observed to remain liquid; the second was the first time that gelling of the sample was observed. Permeabilities were measured by (1) adding about two volumes of sand to one volume of aqueous non-aggregated colloidal silica sol in a 3½" long, 1" I.D. stainless steel core holder; (2) putting the core holder in a constant-temperature oven until the composition prepared in step (1) had gelled and strengthened; (3) letting the core holder cool; (4) attaching the core holder to the permeator and (optionally) heating the core holder; and (5) measuring the permeability of the gel to water under a differential pressure of from 20 to 2700 psi/ft. Untreated sand-filled cores had a permeability of about 5000 millidarcys (md).

EXAMPLES 1–53 used to adjust pH are excluded), temperature at which sample was gelled (Tg° C.), temperature at which permeability was measured (Tp° C.), gel times (hours), permeabilities (Perm in millidarcys) and differential pressure at which permeabilities were measured ($\Delta P/L$ in psi/ft) are given in Table 1. A 'rm' in the 'Tg' or 'Tp' column indicates room temperature (20° to 25° C.). A 'sep' in the 'Gel Time' column indicates that the sample separated into a clear aqueous layer and a viscous silica-rich layer rather than forming a space-filling gel.

TABLE 1

| Example | d | WT % | pH | Added salts (m) NaCl | KCl | CaCl$_2$ | I | Tg(°C.) | Tp(°C.) | Gel Time (hours) | Perm (md) | $\Delta P/L$ (psi/ft) |
|---|---|---|---|---|---|---|---|---|---|---|---|---|
| 1 | 7 | 1 | 6.5 | 0.10 | 0 | 0 | 0.10 | 95 | — | 0–17 | — | — |
| 2 | 7 | 2 | 6.5 | 0.10 | 0 | 0 | 0.10 | 120 | rm | — | 10 | 50 |
| 3 | 7 | 2.7 | 5.2 | 0.069 | 0 | 0.057 | 0.24 | 150 | 150 | — | 2.5 | 40 |
| 4 | 7 | 3 | 6.4 | 0.052 | 0 | 0 | 0.052 | rm | — | 300–1000 | — | — |
| 5 | 7 | 3 | 6.4 | 0.052 | 0 | 0 | 0.052 | 150 | — | 0–4 | — | — |
| 6 | 7 | 3 | 6.5 | 0.10 | 0 | 0 | 0.10 | rm | rm | 50–120 | <0.3 | 50 |
| 7 | 7 | 3 | 7.0 | 0.10 | 0 | 0 | 0.10 | 120 | rm | — | 4 | 85 |
| 8 | 7 | 3 | 7.0 | 0.10 | 0 | 0 | 0.10 | 120 | rm | — | 5 | 340 |
| 9 | 7 | 3 | 7.0 | 0.10 | 0 | 0 | 0.10 | 120 | rm | — | 9 | 510 |
| 10 | 7 | 3 | 8.1 | 0.052 | 0 | 0 | 0.052 | 150 | rm | — | 3 | 55 |
| 11 | 7 | 4 | 1.5 | 0.052 | 0 | 0 | 0.052 | 95 | — | 290–460 | — | — |
| 12 | 7 | 4 | 1.5 | 0.052 | 0 | 0 | 0.052 | 150 | — | 0–100 | — | — |
| 13 | 7 | 4 | 3.1 | 0 | 0.053 | 0 | 0.053 | rm | — | 190–330 | — | — |
| 14 | 7 | 4 | 3.1 | 0 | 0.053 | 0 | 0.053 | 120 | — | 0–17 | — | — |
| 15 | 7 | 4 | 3.1 | 0.052 | 0 | 0 | 0.052 | rm | — | 1100–1700 | — | — |
| 16 | 7 | 4 | 3.1 | 0.052 | 0 | 0 | 0.052 | 150 | — | 0–100 | — | — |
| 17 | 7 | 4 | 5.0 | 0.052 | 0 | 0 | 0.052 | rm | — | 48–78 | — | — |
| 18 | 7 | 4 | 5.0 | 0.052 | 0 | 0 | 0.052 | 150 | — | 0–4 | — | — |
| 19 | 7 | 4 | 7.0 | 0 | 0.053 | 0 | 0.053 | 50 | — | 330–430 | — | — |
| 20 | 7 | 4 | 7.0 | 0 | 0.053 | 0 | 0.053 | 120 | — | 0–17 | — | — |
| 21 | 7 | 4 | 7.0 | 0.052 | 0 | 0 | 0.052 | rm | — | 1100–1700 | — | — |
| 22 | 7 | 4 | 7.0 | 0.052 | 0 | 0 | 0.052 | 150 | — | 0–16 | — | — |
| 23 | 7 | 4 | 7.9 | 0.052 | 0 | 0 | 0.052 | 120 | rm | 150–290 | 1.8 | 55 |
| 24 | 7 | 4.3 | 2.0 | 0 | 0 | 3.3 | 9.9 | rm | — | 44–144 | — | — |
| 25 | 7 | 4.3 | 2.0 | 0 | 0 | 3.3 | 9.9 | 95 | — | 0.5–2 | — | — |
| 26 | 7 | 4.3 | 2.8 | 0 | 0 | 3.3 | 9.9 | rm | — | 44–144 | — | — |
| 27 | 7 | 4.3 | 2.8 | 0 | 0 | 3.3 | 9.9 | 95 | — | 0.5–2 | — | — |
| 28 | 7 | 5 | 6.1 | 0.20 | 0 | 0 | 0.20 | rm | rm | 20–28 | <0.3 | 60 |
| 29[1] | 7 | 5 | 9.0 | 0.41 | 0.009 | 0.009 | 0.63 | rm | — | sep | — | — |
| 30 | 7 | 5 | 9.9 | 0 | 0.24 | 0 | 0.24 | rm | — | 1–17.5 | — | — |
| 31 | 7 | 5 | 9.9 | 0 | 0.24 | 0 | 0.24 | 95 | — | 0.5–1 | — | — |
| 32 | 7 | 5 | 9.9 | 0.24 | 0 | 0 | 0.24 | rm | — | 140–164 | — | — |
| 33 | 7 | 5 | 9.9 | 0.24 | 0 | 0 | 0.24 | 95 | — | 1–17.5 | — | — |
| 34 | 7 | 6 | 7.0 | 0.11 | 0 | 0 | 0.11 | 120 | rm | — | 1.0 | 50 |
| 35 | 7 | 9.9 | 7.2 | 0.225 | 0 | 0.011 | 0.26 | rm | — | 3–4 | — | — |
| 36 | 7 | 9.9 | 7.2 | 0.225 | 0 | 0.011 | 0.26 | 95 | — | 0–0.25 | — | — |
| 37 | 7 | 10 | 7.1 | 0.056 | 0 | 0 | 0.056 | 150 | 70 | 0–3 | 0.2 | 80 |
| 38 | 7 | 15 | 6.6 | 0.059 | 0 | 0 | 0.059 | 95 | rm | 0–1 | 0.35 | 340 |
| 39 | 7 | 15 | 6.6 | 0.059 | 0 | 0 | 0.059 | 95 | rm | 0–1 | 1.6 | 2700 |
| 40[3] | 12 | 3 | 3.0 | 0.44 | 0.009 | 0.009 | 0.67 | 95 | — | 73–91 | — | — |
| 41[3] | 12 | 3 | 6.0 | 0.44 | 0.009 | 0.009 | 0.67 | rm | — | 140–400 | — | — |
| 42[3] | 12 | 3 | 6.0 | 0.44 | 0.009 | 0.009 | 0.67 | 95 | — | 2–25 | — | — |
| 43 | 12 | 3 | 6.1 | 0.10 | 0 | 0 | 0.10 | rm | — | 1900–3700 | — | — |
| 44[3] | 12 | 3 | 8.1 | 0.44 | 0.009 | 0.009 | 0.67 | rm | — | 2–25 | — | — |
| 45[3] | 12 | 3 | 8.1 | 0.44 | 0.009 | 0.009 | 0.67 | 95 | — | 0–2 | — | — |
| 46 | 12 | 5 | 4.9 | 0.11 | 0 | 0 | 0.11 | 150 | rm | 0–5 | 2 | 50 |
| 47 | 12 | 5 | 5.8 | 0.11 | 0 | 0 | 0.11 | 150 | 150 | 0–18 | 2.5 | 20 |
| 48 | 12 | 5 | 7.0 | 0.11 | 0 | 0 | 0.11 | 95 | — | 45–280 | — | — |
| 49 | 12 | 10 | 5.9 | 0.11 | 0 | 0 | 0.11 | 150 | rm | — | 0.5 | 50 |
| 50[2] | 12 | 10 | 8.1 | 0.22 | 0 | 0 | 0.22 | 95 | — | 0–18 | — | — |
| 51[1] | 22 | 3 | 7.1 | 0.46 | 0.010 | 0.010 | 0.70 | 95 | — | 0–1.3 | — | — |
| 52[1] | 22 | 3 | 8.0 | 0.46 | 0.010 | 0.010 | 0.70 | 95 | — | 0–1.3 | — | — |
| 53[1] | 22 | 3 | 9.3 | 0.46 | 0.010 | 0.010 | 0.70 | rm | — | sep | — | — |

[1] Aqueous solutions of Du Pont Ludox ® colloidal silica mixed with synthetic sea water. Ionic strength (I) includes contributions from salts other than those listed.
[2] Surface of colloidal silica modified with aluminate ions.
[3] Footnotes 1 and 2 both apply.

No latent gelling agent was employed except in Examples 10 (sample contains 0.025 wt % acetonitrile) and 23 (sample contains 0.15 wt % hydroxy propionitrile). Average diameter of colloidal silica particles (d in nanometers), weight percent colloidal silica (WT %), initial pH, molality (m) of added salts (NaCl, KCl, CaCl$_2$), total ionic strength of added salts (I, molality; ionic strength from salts originally present and from the acid

EXAMPLES 54–66

Latent gelling agents were added (Examples 55–60 and 62–66) to the silica sol so as to adjust the gel time and to speed gel strengthening. The gelling agents were pH-adjusting agents that hydrolyze or decompose thermally at reservoir temperatures to release an acid or consume a base or both so that the pH was lowered. Table 2 lists gel times observed when a solution of 4 wt % Du Pont Ludox® SM colloidal silica and 0.052 molal NaCl was adjusted to various initial pH's and then mixed with various pH-adjusting agents. The solutions that contained a pH-adjusting agent seemed to strengthen faster in the pipets than did those containing no latent gelling agent.

TABLE 2

| EXAMPLE | Tg (°C.) | pH-ADJUSTING AGENT NAME | WT % | GEL TIME (Hours) |
|---|---|---|---|---|
| 54 | rm | none | 0 | >1700 |
| 55 | rm | γ-butyrolactone | 0.30 | 430–480 |
| 56 | 50 | γ-butyrolactone | 0.088 | 50–75 |
| 57 | 50 | γ-butyrolactone | 0.30 | 10–50 |
| 58 | 95 | γ-butyrolactone | 0.032 | 150–270 |
| 59 | 95 | γ-butyrolactone | 0.088 | 0–21 |
| 60 | 95 | acetamide | 0.022 | 480–530 |
| 61 | 120 | none | 0 | >700 |
| 62 | 120 | acetamide | 0.022 | 150–285 |
| 63 | 120 | acetamide | 0.059 | 75–100 |
| 64 | 120 | γ-butyrolactone | 0.032 | 0–3.5 |
| 65 | 120 | hydroxypropionitrile | 0.026 | 480–530 |
| 66 | 120 | hydroxypropionitrile | 0.13 | 150–285 |

EXAMPLES 67–72

A latent gelling agent was added to delay gel formation. Table 3 lists typical gel times of 3 wt % Du Pont Ludox® SM colloidal silica, 0.05 m NaCl, and 0.0075 m $CaCl_2$ that contain a 0/1, 1/1, 1.5/1, or 2/1 mole ratio of chelating agent to $Ca++$. Nitrilotriacetic acid (NTA) and sodium citrate (Citrate) were used as chelating agents.

TABLE 3

| EXAMPLE | CHELATING AGENT | MOLE RATIO | TEMP. (°C.) | GEL TIME (HOURS) |
|---|---|---|---|---|
| 67 | NONE | 0/1 | 95 | <1 |
| 68 | NTA | 1/1 | 95 | 5–9 |
| 69 | NTA | 1.5/1 | 95 | 22–30 |
| 70 | NTA | 2/1 | 95 | >60 |
| 71 | Citrate | 1/1 | 95 | 5–9 |
| 72 | Citrate | 2/1 | 95 | 5–9 |

EXAMPLES 73–76

Consolidated Berea cores were treated with colloidal silica formulations having gel times ranging from 5.8 to 6.6 hours. The permeability of the cores after treatment was measured after a shut-in or aging time at a constant temperature of 120° F. that varied from 15.5 to 134 hours past the gel time of the colloidal silica formulations. The initial permeability measurements after aging were made with low pressure gradients (100 to 250 psi/ft). Then, the gel treatments were tested to failure by imposing increasing pressure across the cores and monitoring the effluent flow rates. Table 4 summaries the results of the testing.

The details for a single core test are outlined below:

A Berea core, 2 inches in length and 1.5 inches in diameter, was placed in a Hassler pressure device and confined with 750 psi fluid pressure. The core was completely saturated with a field-produced water (nominally 2.5% total dissolved solids and 800 ppm hardness ($Ca++$ and $Mg++$)). The core plug had a liquid pore volume of 10 to 12 ml. The initial permeability of the cores used in the evaluation ranged from 260 to 450 md. The core was preflushed with salt solution of 0.1 m NaCl in deionized water that matched the gel solution salinity. Approximately 5 pore volumes of the preflush solution were flowed through the core at a rate of 2.0 ml/min. The core was treated with 5 pore volumes of the silica solution at a rate of 2.0 ml/min. The formulation consisted of 7.5% by weight colloidal silica neutralized to a pH of 7.5 with HCl and an added NaCl content equal to 0.1 m. After gelation and curing, the permeability of the treated core was measured with the preflush salt solution at low differential pressure (to 250 psi/ft). The initial permeability measurement was followed by flow rate determinations at increasing pressures. The pressure gradient increased ranged from 100 psi/ft increments on the core tested in Example 73 to 400 psi/ft increments during the testing of Example 76. The equipment was limited to a maximum gradient of 4000 psi/ft by the length of core plug used in the testing.

The results of the testing are summarized below:

The initial permeability reduction measured at low gradients of collodial silica gel is not a strong function of cure time. The pressure gradient stability of the gel is a strong function of cure time. The pressure gradient testing generated pressure vs. flow rate curves that were characterized by two distinct transition gradients: (1) the first small deviation from the low pressure permeability value, and (2) a yield value where an order of magnitude permeability increase was detected. All core tests exhibited substantial pressure gradient stability. With limited curing of only 2.7 times the gel time, the gel had developed 45% of the extended cure time (20 multiples of the gel time) strength. An additional cure of 6 multiples of the gel time developed 80% of the extended cure time strength. The gels maintain permeability reduction in core of greater than 99.8% at pressure gradients of more than 20% above the yield gradient. In these tests, the over-pressure was maintained for a limited duration (not more than 1 hour).

TABLE 4

| Example No.* | Cure Time** hr | Initial Brine Perm md | Post-Treatment Perm md | First Perm Deviation psi/ft | Yield Gradient psi/ft | Final Perm md |
|---|---|---|---|---|---|---|
| 73 | 15.5 [2.7] (A)* | 320 | 0.02 | 1000 | 1450 | 0.54 @ 2130 psi/ft |
| 74 | 40.0 [6.0] (B) | 450 | 0.03 | 1900 | 2450 | 0.51 @ 3150 psi/ft |
| 75 | 40.0 [6.9] (A) | 340 | 0.02 | 2000 | 2550 | 0.28 @ 3680 psi/ft |
| 76 | 134 [20.3] | 260 | 0.02 | 2400 | 3200 | 0.10 |

TABLE 4-continued

| Example No.* | Cure Time** hr | Initial Brine Perm md | Post-Treatment Perm md | First Perm Deviation psi/ft | Yield Gradient psi/ft | Final Perm md |
| --- | --- | --- | --- | --- | --- | --- |
| | (B) | | | | | @ 3740 psi/ft |

*The tests used the same formulation:
7.5% silica (Ludox ® SM diluted with tap water) pH = 7.5 (HCl neutralization) .1 m added NaCl
The tests were conducted at 120° F. Two series of were complete - (A) and (B). The formulation gel time for series (A) was 5.8 hrs. and for series (B) 6.6 hrs.
**The number in brackets refers to the cure time as a multiple of the formulation gel time.

EXAMPLES 77–79

Consolidated Berea cores were treated with a Ludox ® SM collodial silica solution using 5, 7.5 and 10 weight % silica concentrations. The solution gel times ranged from 4.0 to 6.6 hours. The core treatments were shut-in or cured for longer than 15 multiples of the gel time to allow extended curing. Examples 77 and 79 were evaluated at 90° F. while Example 78 was tested at 120° F. The core treatment and testing details were identical to those described for Examples 73 through 76. The results of the testing are summarized in Table 5.

The conclusions drawn from the results are as follows:

The pressure gradient stability of the colloidal silica gels in core is a strong function of silica concentration. Gels formulated with lower silica concentration (5% silica, Example 77) will not provide the pressure gradient stability required in the near wellbore region under some reservoir conditions. However, these gels have sufficient pressure resistance for in-depth reservoir placement and fluid diversion. Under reservoir conditions where high steady-state and transient pressure gradients are anticipated, silica concentration of 7.5% and greater (Examples 78 and 79) can be used in the near wellbore region to provide pressure gradient stability.

showed that the injection rate into the thief zone was too low to be reliably measured.

Three different solutions were prepared for this test:
1. 25 bbls of 22.5 wt % NaCl
2. ~100 bbls of 6 wt % $SiO_2$ (Ludox ®SM)
3. ~50 bbls of 15 wt % $SiO_2$ (Ludox ®SM).

The mix water was determined to have an effective salinity equivalent to 0.04 m NaCl. This was appropriately compensated when adding salt for gel time control. The 6 wt % silica solution was neutralized to ~pH 6.5 by addition of 18 gallons of 28 wt % HCl. The 15 wt % silica solution was neutralized to ~pH 7.5 by addition of ~18 gallons of 28 wt % HCl. The gel time of these stock solutions was adjusted by blending with metered amounts of the concentrated brine solution during treatment injection. The colloidal silica solutions were injected sequentially, beginning with the 6 wt % solution. The injection schedule, desired gel time, desired NaCl molality, and brine injection volume ratio are given in Table 6.

TABLE 6

| Silica Concentration (wt %) | Cumulative Injected Volume (bbls) | Elapsed Time (hrs) | Gel Time (hrs) | Added NaCl m | Brine/Treatment Volume Ratio |
| --- | --- | --- | --- | --- | --- |
| 6 | 0–25 | 0–2 | 14–12 | 0.10 | 0.0243 |
| | 25–50 | 2–4 | 12–10 | 0.10 | 0.0243 |
| 15 | 50–75 | 4–6 | 10–8 | 0.125 | 0.0306 |
| | 75–100 | 6–8 | 8–6 | 0.175 | 0.0435 |
| | 100–125 | 8–10 | 6–4 | 0.075 | 0.0193 |
| | 125–150 | 10–12 | 4–2 | 0.100 | 0.0259 |

TABLE 5

| Example No. | Formulation Silica/pH/Salinity | Gel Time hr | Cure Time** hr | Initial Brine Perm md | Post Treatment Perm md | First Perm Deviation psi/ft | Yield Gradient psi/ft | Final Perm md |
| --- | --- | --- | --- | --- | --- | --- | --- | --- |
| 77 | 5%/7.5/.25 m in DI water | 4.5 @ 90° F. | 160 [36] | 490 | 0.7 | 560 | 700 | 1.8 @ 930 psi/ft |
| 78 | 7.5%/7.5/.10 m in tap water | 6.6 @ 120° F. | 134 [20.3] | 260 | 0.02 | 2400 | 3200 | .1 @ 3740 psi/ft |
| 79 | 10%/7.5/.13 m in tap water | 4.0 @ 90° F. | 68 [17] | 390 | 0.01 | +4000+ | +4000+ | .01 @ 3900 psi/ft |

*The formulation specifies the weight percent silica in the solution, the pH of the solution prior to salt addition (neutralized with HCl) and the molality of the salt (NaCl) added to the solution prior to core treatment.
**The number in brackets refers to the cure time as a multiple of the formulation gel time.
+Equipment limitations prevented testing to greater than 4000 psi/ft. As a result, the yield gradient for the 10% gel could not be determined.

EXAMPLE 80

Radioactive tracer surveys showed that a water-flood injection well was losing 94% of the injected water to a thief zone above the target reservoir. The thief zone was mechanically isolated at the wellbore with an open-hole bridge plug and a workstring packer. The thief zone was preflushed with 150 barrels of low salinity brine. A total of 130 barrels of colloidal silica solution were then injected into the thief zone. A 100 barrel slug of 6 weight percent colloidal silica solution was followed by 30 barrels of 15 weight percent colloidal silica solution. The well was shut-in for three days to allow the gel to cure. Initial testing following treatment

EXAMPLE 81

State law requires demonstration of injection well casing integrity. In one state, a test is conducted for that purpose by filling the tubing/casing annulus with water, raising the casing surface pressure to at least 500 psi, shuting-in the annulus, and then monitoring th casing pressure. A maximum of 5% pressure decline (~25 psi) during a 30-minute test period is tolerated.

Colloidal silica gel was used to patch leaking casing in a waterflood injection well. Prior to treatment, this well showed a 30-minute test pressure decline of at least 100 psi. The casing was prepared for treatment by filling the tubing/casing annulus with low salinity brine and pressurizing the system for about 5 hours to preflush the leak. Approximately 0.5 bbls of brine were displaced through the leak at surface pressures ranging from 550 psi to 700 psi. The packer was released, and the tubing casing annulus was filled with 10 weight percent colloidal silica solution. The packer was reset, and the system was pressurized to about 650 psi. The gel solution was squeezed into the leak for about 9 hours. Less than 1 barrel of colloidal silica solution was pumped into the leak. The packer was released, and the gel solution was reversed out of the tubing/casing annulus with KCl packer fluid. The gel solution had built substantial viscosity. The well was shut-in for 3 days. Following treatment, it was observed that the 30-minute test pressure decline had been reduced to less than 20 psi, which is within statutory limits.

Treatment formulation:

A 10% $SiO_2$ solution was prepared. The pH was adjusted to 7.5 with 28 wt % HCl. Salt (in the form of a concentrated NaCl solution) was added just before starting to inject the treatment solution. The treatment slug was made by mixing 6.6 bbls (5 drums) of Ludox® SM silica sol with 15.5 bbls of fresh water to yield about 22.5 bbls of silica solution, neutralizing to ~pH 7.5 by addition of 5.4 gallons of 32 wt % HCl, and, just before treatment injection, mixing in 44 lbs of NaCl. The salt plus the ions present in the mix water yielded an effective NaCl concentration of about 0.012 m, and an observed gel time of about 12 hours.

We claim:

1. A process for selectively plugging permeable zones in subterranean formations or for plugging subterranean leaks which comprises injecting into the permeable zone or the site of the subterranean leak an aqueous solution containing 1 to 70 weight percent of a non-aggregated colloidal silica sol having a particle diameter in the range between 4 and 100 nm and a PH in the range between about 1 and 10, said solution as injected having a desired gel time in said zone or at said site without the necessity of being contacted by a separately injected material.

2. The process of claim 1 wherein said solution contains 2 to 40 weight percent of said non-aggregated silica sol.

3. The process of claim 2 wherein said solution contains 5 to 15 weight percent of said non-aggregated silica sol.

4. The process of claim 3 wherein said non-aggregated silica sol has an average particle diameter in the range between about 4 and 22 nanometers.

5. The process of claim 4 wherein said pH is in the range between about 5 and 9.

6. The process of claim 5 wherein the total ionic strength in said zone or at said site when said solution is injected therein is less than 10.

7. The process of claim 6 wherein said total ionic strength is less than 3.5.

8. The process of claim 6 wherein said total ionic strength is 0.75 or less.

9. The process of claim 4 wherein said pH is in the range between 5.5 and 7.5.

10. The process of claim 9 wherein the total ionic strength in said zone or at said site when said solution is injected therein is less than 10.

11. The process of claim 10 wherein said total ionic strength is less than 3.5.

12. The process of claim 10 wherein said total ionic strength is 0.75 or less.

13. The process of claim 3 wherein said average particle diameter is in the range between 7 and 22 nanometers.

14. The process of claim 13 wherein said pH is in the range between about 5 and 9.

15. The process of claim 14 wherein the total ionic strength in said zone or at said site when said solution is injected therein is less than 10.

16. The process of claim 15 wherein said total ionic strength is less than 3.5.

17. The process of claim 15 wherein said total ionic strength is 0.75 or less.

18. The process of claim 13 wherein said pH is in the range between 5.5 and 7.5.

19. The process of claim 18 wherein the total ionic strength in said zone or at said site when said solution is injected therein is less than 10.

20. The process of claim 19 wherein said total ionic strength is less than 3.5.

21. The process of claim 19 wherein said total ionic strength is 0.75 or less.

22. The process of claim 1, 2, 3, 4, 5, 6, 7, 8, 9, 10, 11, 12, 13, 14, 15, 16, 17, 18, 19, 20, or 21 wherein injection is effected through a wellbore and the gel time of said non-aggregated colloidal silica solution is varied so that the portion of said solution that is injected last into said formation gels at about the same time as the portion of said solution that is injected first.

23. The process of claim 22 wherein said aqueous solution additionally contains as a latent gelling agent (a) an aqueous solution containing a multivalent cation and a chelating agent or (b) a material that hydrolyzes or decomposes thermally to release an acid, consume a base, release a base, consume an acid, or release both an acid and a base.

* * * * *